United States Patent
Reback et al.

(10) Patent No.: US 6,299,124 B1
(45) Date of Patent: Oct. 9, 2001

(54) STACKABLE POST HOLDER

(76) Inventors: David G. Reback, 12204 W. End, North Palm Beach, FL (US) 33408; Michael Kish, 14049 Harbor La., Palm Beach Gardens, FL (US) 33410

( * ) Notice: Subject to any disclaimer, the term of this patent is extended or adjusted under 35 U.S.C. 154(b) by 0 days.

(21) Appl. No.: 09/588,876

(22) Filed: Jun. 6, 2000

(51) Int. Cl.⁷ .................................................. F16M 13/00
(52) U.S. Cl. ...................... 248/519; 248/523; 248/527; 248/910; 47/23; 47/82; 47/83; 47/26
(58) Field of Search ................................. 248/523, 910, 248/527, 519; 47/23, 82, 83, 26, 21, 30

(56) References Cited

U.S. PATENT DOCUMENTS

| | | | |
|---|---|---|---|
| 1,240,376 | 9/1917 | Saucier . | |
| 1,631,227 | * 6/1927 | See ........................................ | 248/519 |
| 1,846,891 | * 2/1932 | Miller .................................... | 248/519 |
| 2,044,192 | * 6/1936 | Templin, Jr. ......................... | 248/519 |
| 2,613,899 | * 10/1952 | Wagner et al. ...................... | 248/519 |
| 2,913,202 | * 11/1959 | Meldrum .............................. | 248/519 |
| 4,596,262 | 6/1986 | Tegze . | |
| 4,884,363 | * 12/1989 | Sofy ..................................... | 47/40.5 |
| 4,976,411 | * 12/1990 | Gordon et al. ....................... | 248/524 |
| 5,086,583 | * 2/1992 | Breen ................................... | 47/40.5 |
| 5,509,229 | * 4/1996 | Thomasson et al. ................. | 47/21 |

* cited by examiner

*Primary Examiner*—Ramon O. Ramirez
*Assistant Examiner*—Kimberly Wood
(74) *Attorney, Agent, or Firm*—McHale & Slavin

(57) ABSTRACT

A portable and stackable post support for securely holding post like structures is formed in a hollow pyramidal shape. The post support has a sealable cavity for holding a suitable ballast material such as water or sand. A receptacle opening receives the post like structures and includes thumb screws for manually securing a post like structure in position. When filled with a ballast material, the post support provides a base for anchoring top heavy devices such as Tiki lamps. When the post structure is empty of ballast, it can be easily transported. Additionally, a plurality of post structures is easily stacked and stored even full of a ballast material such as sand.

3 Claims, 4 Drawing Sheets

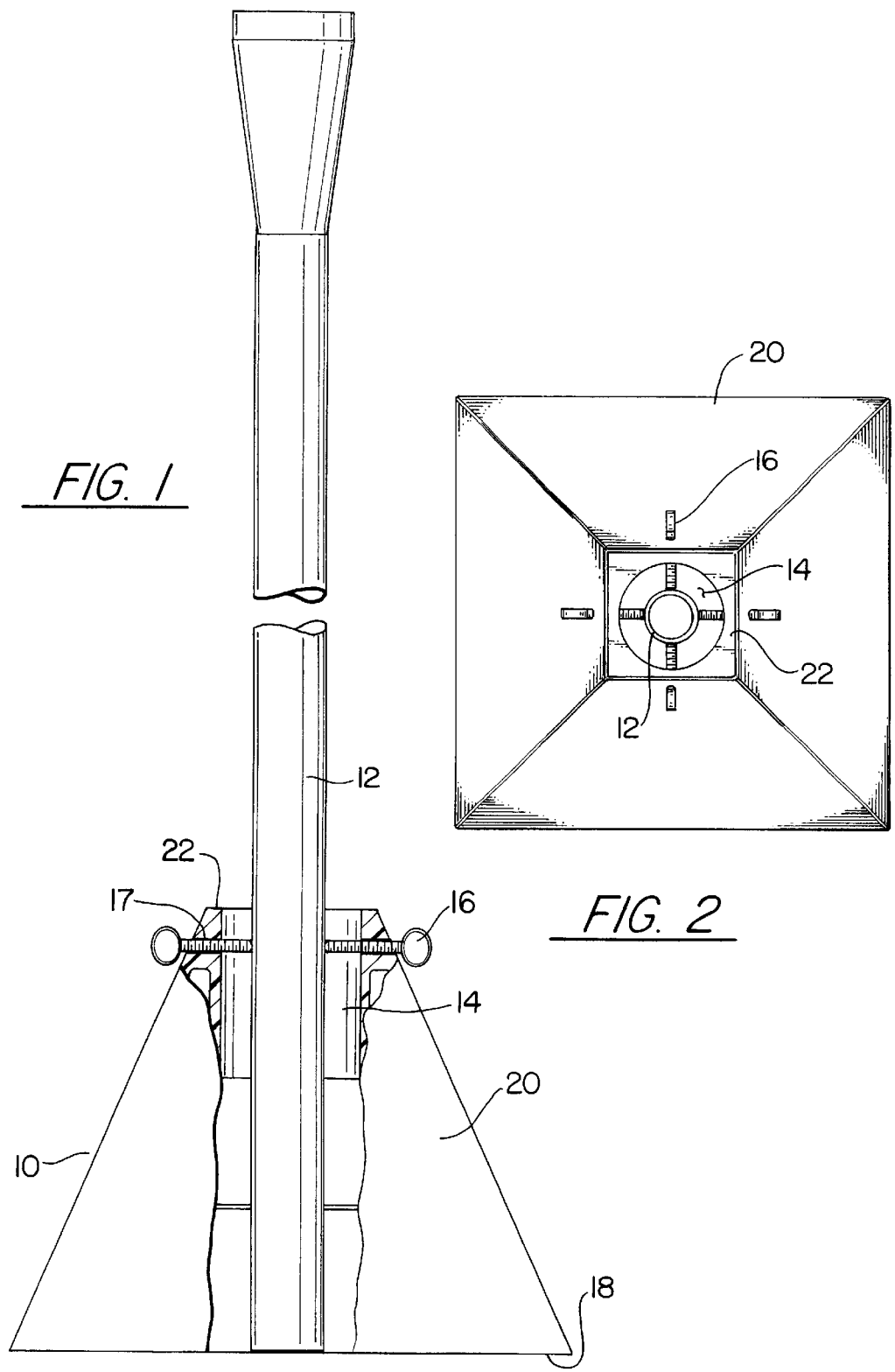

STACKABLE POST HOLDER

FIELD OF THE INVENTION

This invention relates generally to outdoor lighting and, more particularly, to a stackable light post holder having removable ballast.

BACKGROUND OF THE INVENTION

Temporary lighting is often desirable for outdoor events. Lights placed strategically throughout the lawn, patio, and sidewalk areas provide both an ambience as well as a level of safety. Tiki lamps provide a unique style of temporary lighting in that the lamps can be used for ambience, safety, and to help keep flying insects away. The lamps consist of a wick that, when lit, draws fuel from a replenishable cannister. The cannister is typically secured to a post capable of holding the lamp at a height that allows for safe operation.

A problem with post mounted lamps is that the post must be secured to the ground or a fixed object for safe operation. If the post is not firmly secured, the lamp could fall. This would expose both the fuel and a lit wick to surrounding objects and surfaces. The most common way of securing a post is jamming the post into the ground. Unfortunately, ground mounting a post in the ground is not practical in all situations.

Inserting the post in the ground could be difficult due to certain characteristics associated with soiled surfaces. These characteristics include, but are not limited to, dense soil caused by dryness or the presence of clays, extremely loose soils caused by sands or organic content, the presence of aggregates such as rocks or stones, the existence of tree roots, debris buried beneath the surface, pipes associated with plumbing and sprinkler systems as well as in ground utility lines. Additionally, it is impractical to insert post mounted lamps in docks, patios, and pool decks or other similar surfaces.

To accommodate difficult post mounting conditions, various types of portable bases may be employed. For example, a metal frame such as that used for a Christmas tree stand can be employed to hold such posts. However, such stands are not generally suited for exterior use and are not aesthetically pleasing due to their size. Additionally, these type stands are not capable of withstanding wind gusts that could easily topple a top heavy post mounted lamp. Alternatively, a concrete form may be used wherein the weight of the form prevents movement of the post. Should an attempt be made to move or transport the weighted form, the weight of such concrete forms provides for an unwieldy structure. In either event, storage of multiple stands/forms can be impractical due to the amount of space consumed and the difficulty of storing heavy objects. For instance, the stacking or multiple concrete forms on top of one another could be a dangerous proposition should the stands topple.

Thus, the prior art does not address the need for a stackable, portable stand that can be placed on any surface, the need for stability in wind gusts, and the necessity of storage in a relatively small area.

DESCRIPTION OF THE PRIOR ART

U.S. Pat. No. 1,240,376 discloses a base with a center hollow shaft for receiving a Christmas tree and a hollow cavity for insertion of sand or water. However, it is composed of metal and is not stackable.

U.S. Pat. No. 4,596,262 discloses a plastic base for supporting an umbrella stand with a central hollow shaft for receiving the umbrella and a hollow cavity for a ballast material. However, it is also not stackable and is also larger than this invention.

In summary, the prior art fails to teach or suggest, when viewed singularly or in any combination, an apparatus for temporary placement of post mounted lamps that, when empty, is easily stackable, transportable, and storable.

SUMMARY OF THE INVENTION

The present invention is a pyramidal shaped apparatus having a receptacle opening for receiving and securely holding a tubular structure such as a post for a Tiki lamp. The apparatus, constructed of a suitable rigid material, has a hollow core with an opening for ingress and egress of ballast material on the bottom, and a squared off top. The apparatus is unique in that it has a stackable design for purposes of compact storage. When desired, the hollow core is filled with water, sand, or similar material capable of insertion into the structure.

The receptacle portion of the apparatus includes a shaft type opening sized to accommodate a post or a like tubular structure. Placement of a shaft or post into the receptacle is secured by use of a mechanical fastener, such as a threaded bolt.

In the preferred embodiment, the base structure is made of a lightweight plastic material having at least one internal cavity for placement of ballast material such as water or sand. The opening of the cavity is preferably located along a bottom edge of the structure wherein a filling cap is secured and concealed from view. Alternatively, a filling cap can be located in any accessible position for ease of ballast filling and removal.

Without the ballast material, the apparatus weighs very little and the hollow core design allows for storage stacking providing a unit that can be easily manufactured, packaged, transported, and stored. In this manner, the end consumer is not burdened with the cost of shipping a heavy or large structure and can employ a type of ballast determined by the conditions at the time of use. For instance, the ballast may consist of water or sand depending on the amount of desired weight. If higher winds are expected, the end user could decide to use a heavier ballast material.

Accordingly, it is an objective of the instant invention to provide a portable holding apparatus for top heavy post mounted lamp type structures, wherein the weight can be easily added for ballast and, if desired, removed for ease of storage.

It is a further objective of the instant invention to provide a portable holding apparatus that is stackable for storage having an inter-nesting shape to provide stable, compact stacking. Additionally, if a ballast material such as sand is used, the ballast need not be removed for the stacking feature to apply. That is, the units are stackable even if they are full of sand.

It is yet another objective of the instant invention to provide a portable holding apparatus that is inexpensive to manufacture, easily packaged, economically transported, and allows the end consumer to determine the type and amount of ballast required for a particular installation.

Other objectives and advantages of this invention will become apparent from the following description taken in conjunction with the accompanying drawings. The following description and drawings set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 1 is a cross-sectional side view of the post support with the receptacle portion secured in place and a tubular structure inserted therein, FIG. 2 is a top view of the post support with a post secured in place.

DETAILED DESCRIPTION OF THE INVENTION

Figure 3:
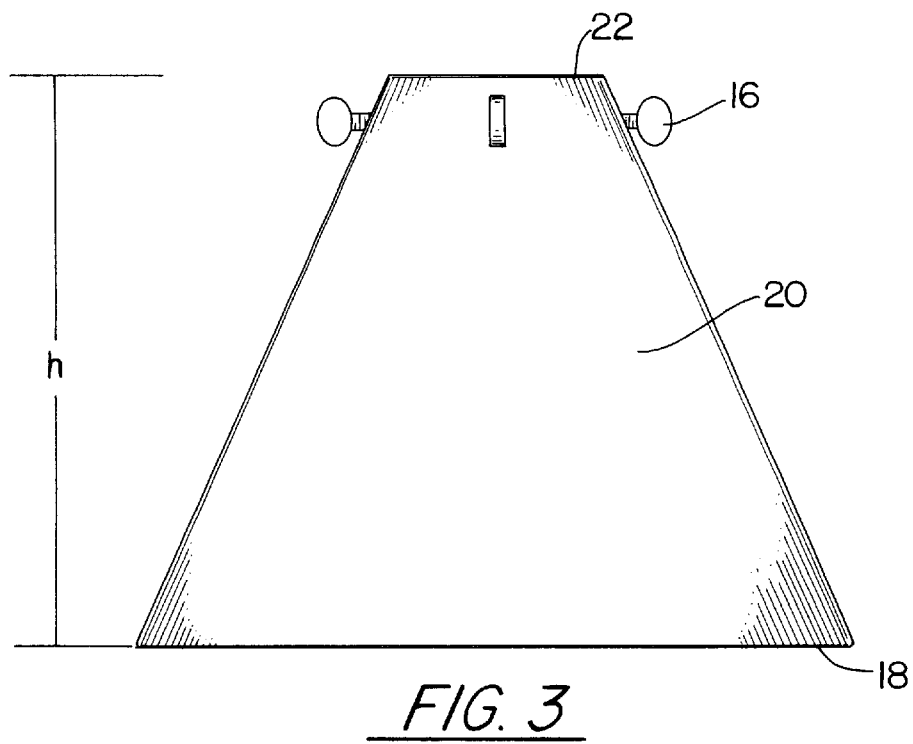
FIG. 3 is a side view of the post support.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Now referring to FIG. 1, shown is a partial cross-sectional view of the base portion 10 constructed from a rigid material such as plastic. Post 12, not claimed, is shown in pictorial being held within a receptacle portion 14 of the base 10. The receptacle portion 14 is formed from a centrally disposed aperture for placement of the post 12. A mechanical attachment means, preferably thumb screws 16 are inserted through threaded bolt hole 17 on the base portion 10 for use in locking the post 12 in position. The outside portion of the base portion 10 includes a substantially flat bottom surface 18 with substantially flat angular positioned side walls 20 leading to upper surface 22.

FIG. 2 depicts a top view of the base portion 10 illustrating the preferred pyramidal shape. Post 12 is shown secured in position by attachment screws such as the four thumb screws 16 depicted, one on each of the surfaces for securing the receptacle portion 10 in a fixed position. The receptacle portion 14 is sized to accommodate from about ½ inch to 2½ inch posts as depicted in FIGS. 1 and 2, or any shaped support structure wherein the attachment screws can be adjusted to accommodate the particular shape of the post.

Figure 4:
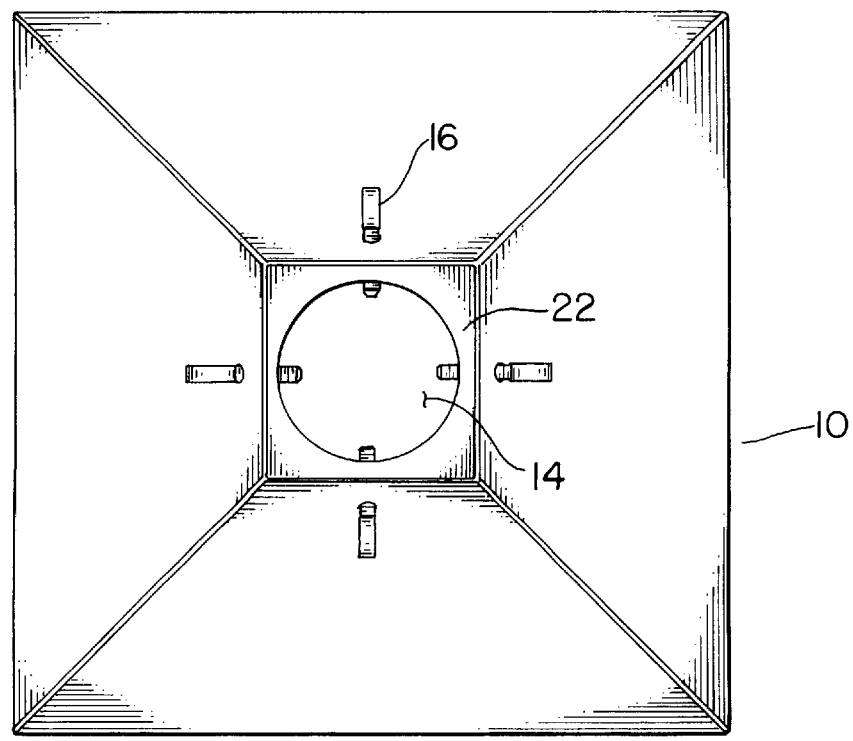
FIG. 4 is a top view of the post support without a post.

FIG. 3 illustrates the base portion 10 with the receptacle portion 14 available for receipt of an oversize support post. The screws 16 are withdrawn to provide a receptacle capable of receiving a large diameter post, not shown. FIG. 4 provides a side view of the pyramidal shaped base portion 10. In the preferred embodiment each side 20 of the pyramidal shape is about eight inches in height h with the bottom surface 18 of each side about ten inches long, and the top surface 22 is about 3 inches wide. The thumb screws 16 are located along the upper top center of each of the sides 20.

Figure 5:
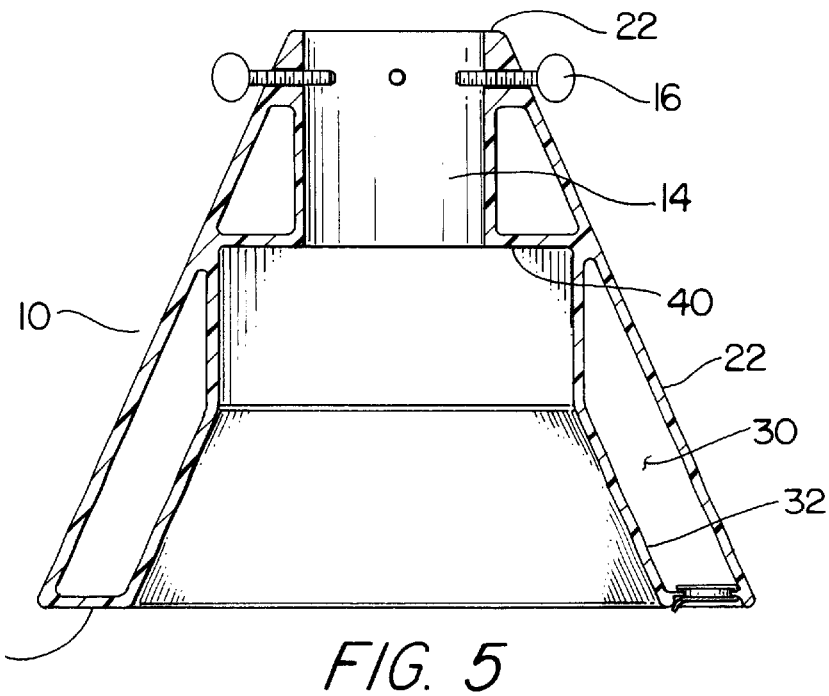
FIG. 5 is an cross-sectional side view of the post support.

Now referring to FIG. 5, a cross-sectional view of the pyramidal shaped base portion 10 is depicted illustrating a cavity 30 formed by the outer side surface 20, bottom surface 18 and inner side surface 32. Depending on the size of the post support, the cavity 30 may hold approximately one gallon of fluid providing approximately seven pounds of ballast. Alternatively, the addition of sand into the cavity may allow for as much as fifteen pounds of ballast. The bottom 18 extends inward from the outer wall 20 to the inner wall 32. The inner wall 32 extends upwardly parallel to the outer wall 20 and then extends vertically until coming into contact with outer wall 20 forming the cavity/hollow interior. An interior wall extends horizontally 40 and vertically 42 to form the receptacle portion 14 until reaching the same height as the outer wall 20. In the preferred embodiment, horizontal bottom 18 is about 1.375", the inner wall 32 extends parallel to the outer wall 20 about 2.75" and then vertically about 2.25". The aperture that forms the receptacle portion is preferably 2.5" with the mechanical attachment screws 16 about 0.75" beneath the top surface 22.

Figure 6:
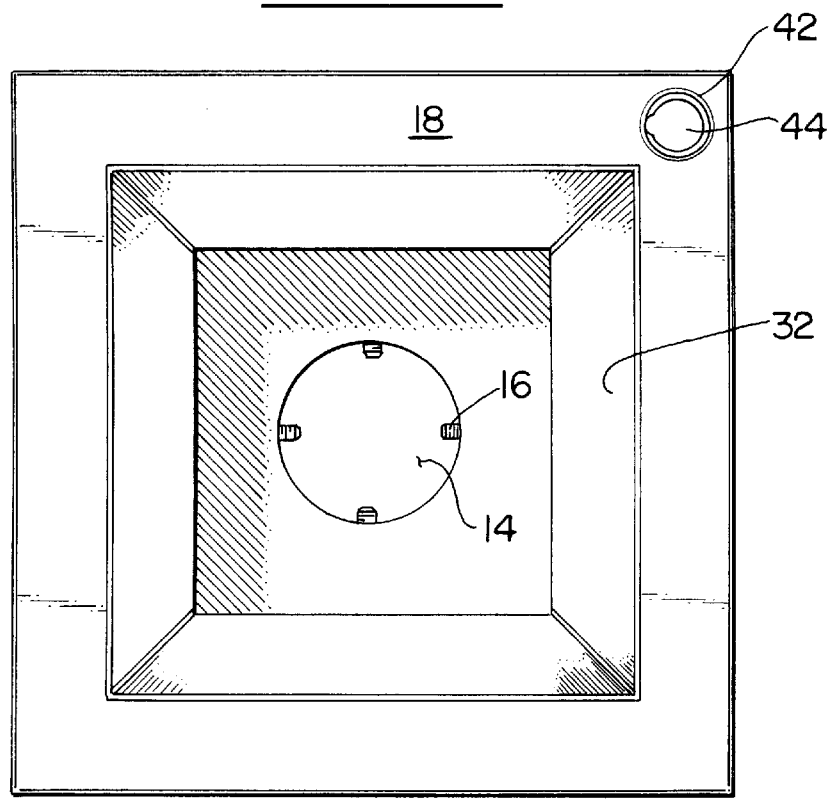
FIG. 6 is a bottom view of the post support.

Referring now to FIG. 6, shown is a bottom view of the pyramidal shaped base portion 10 depicting the hollow core that allows for nesting of multiple bases 10. The inner wall 32 having an angle and curvature to accept an adjoining base 10', not shown, wherein the top surface 22 of a nesting support will engage the horizontal wall 40 of an adjoining support. The nesting structure prevents unintentional locking of multiple supports by eliminating the possibility of frictional surface engagement between a outer side wall 20 and inner side wall 32.

Located along the bottom surface 18 between the outer wall 20 and the inner wall 32 is an opening 42 for ingress and egress of a suitable ballast material such as sand, water, or the like. The opening includes a malleable cap 44 such as a rubber, plastic, metal, or the like grommet for covering of the opening once the ballast is inserted. The support structure 10 can then be securely placed on any flat surface and be readily receptive to a post mounted lamp or any other suitable tubular structures as determined. After the needed use is over, the ballast material can be removed and the hollow cored apparatus can be stacked one upon the other and easily transported and stored. The shape of the structure provides for stable stacking preferred by retail stores as well as the consumer. Further, the stacking facilitates shipping by taking the least amount of space and providing a stable assembly that can be easily secured. If desired, the end consumer can also stack the units while full of ballast material.

Figure 7:
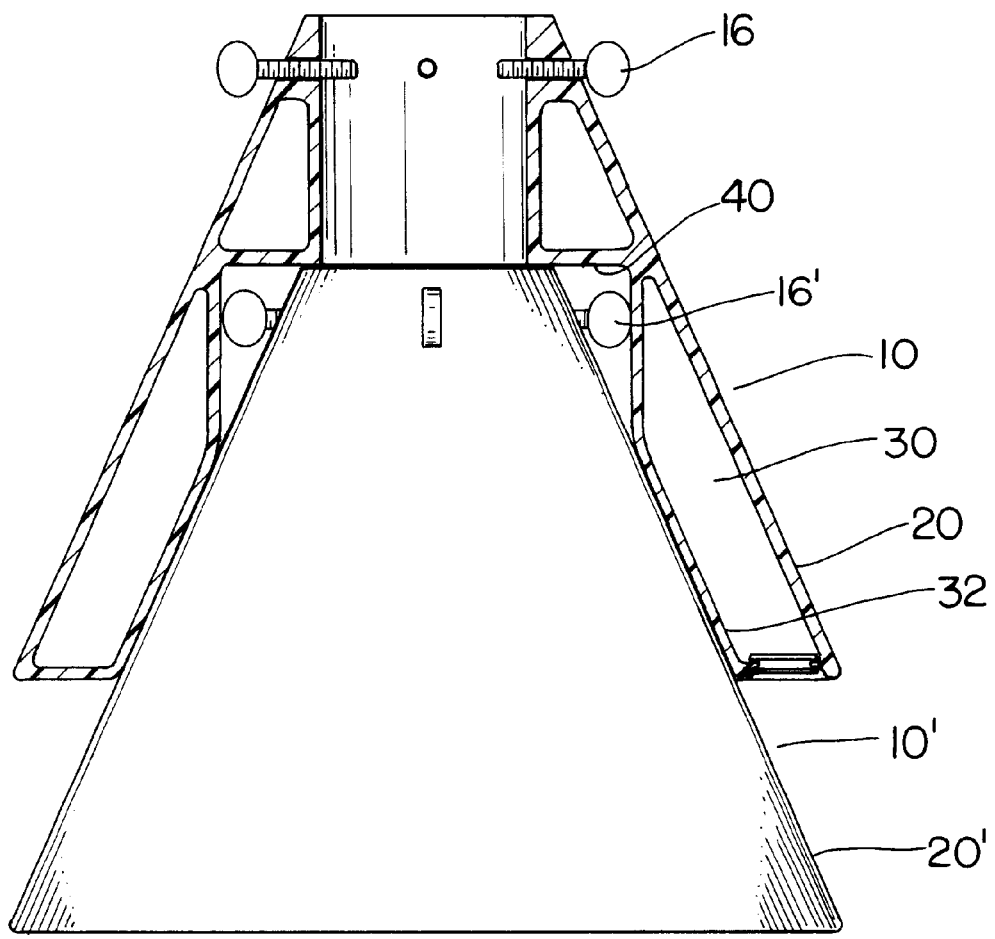
FIG. 7 is a pictorial view further providing a partial cross sectional view to illustrate stacking of the post supports.

FIG. 7 illustrates the stacking of the post supports. Post support enumerated 10' having outer wall surface 20' is placed beneath post support 10 adjacent inner wall surface 32. The thumb screws 16' are shown nested beneath surface 40 of the post support 10 eliminating the need for disassembly.

It is to be understood that while we have illustrated and described certain forms of our invention, it is not to be limited to the specific forms or arrangement of parts herein described and shown. It will be apparent to those skilled in the art that various changes, including changes to the shape, may be made without departing from the scope of the invention and the invention is not to be considered limited to what is shown in the drawings and described in the specification.

What is claimed is:

1. A portable and stackable post holder comprising:
    a pyramidal base structure having an inner and an outer wall, said outer wall uniformly sloping from a larger lower edge to a smaller upper edge;
    an opening in said upper edge, a plurality of screws extending through said inner and outer walls into said opening for securing a post;
    a bottom surface connecting said inner and outer walls about the periphery of said pyramidal structure;

a lower portion of said inner wall extending from said bottom surface toward said opening parallel to said outer wall, an upper portion of said inner wall extending parallel to said opening and intersecting said outer wall about the periphery of said pyramidal structure, the distance between said upper portion of said inner wall about said periphery being greater than the combined distance of said screws and said opening;

said lower portion of said inner wall, said outer wall, said bottom surface and said upper portion of said inner wall forming a ballast cavity;

said bottom surface having a resealable aperture for insertion of ballast.

2. A portable and stackable post holder or claim 1 wherein said post holder is formed from a single piece of molded plastic.

3. A plurality of portable and stackable post holders temporarily vertically assembled one on top of the other, each of said post holders comprising:

a pyramidal base structure having an inner and an outer wall, said outer wall uniformly sloping from a larger lower edge to a smaller upper edge;

an opening in said upper edge, a plurality of screws extending through said inner and outer walls into said opening for securing a post;

a bottom surface connecting said inner and outer walls about the periphery of said pyramidal structure;

a lower portion of said inner wall extending from said bottom surface toward said opening parallel to said outer wall, an upper portion of said inner wall extending parallel to said opening and intersecting said outer wall about the periphery of said pyramidal structure, the distance between said upper portion of said inner wall about the periphery being greater than the combined length of said screws and said opening;

said lower portion of said inner wall, said outer wall, said bottom surface and said upper portion of said inner wall forming a ballast cavity;

said bottom surface having a resealable aperture for insertion of ballast;

whereby said outer surface of one of said plurality of said post holders is in supporting contact with said lower portion of said inner wall of another of said plurality of post holders and said screws and said opening of said one of said plurality of post holders is freely disposed within said upper portion of said inner wall of said other of said plurality of said post holders.

* * * * *